*(12)* United States Patent
Kauffmann et al.

(10) Patent No.: US 9,460,340 B2
(45) Date of Patent: Oct. 4, 2016

(54) SELF-INITIATED CHANGE OF APPEARANCE FOR SUBJECTS IN VIDEO AND IMAGES

(71) Applicant: Google Inc., Mountain View, CA (US)

(72) Inventors: Alejandro José Kauffmann, San Francisco, CA (US); Christian Plagemann, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 165 days.

(21) Appl. No.: 14/170,545

(22) Filed: Jan. 31, 2014

(65) Prior Publication Data

US 2015/0220777 A1 Aug. 6, 2015

(51) Int. Cl.
*G06K 9/00* (2006.01)
*H04N 5/232* (2006.01)
*H04N 5/262* (2006.01)

(52) U.S. Cl.
CPC ....... *G06K 9/00362* (2013.01); *G06K 9/00771* (2013.01); *H04N 5/23229* (2013.01); *H04N 5/2621* (2013.01)

(58) Field of Classification Search
None
See application file for complete search history.

(56) References Cited

U.S. PATENT DOCUMENTS

| | | | | |
|---|---|---|---|---|
| 7,844,076 | B2 * | 11/2010 | Corcoran | G06T 5/00 348/152 |
| 8,259,208 | B2 * | 9/2012 | Ciurea | G06F 3/0488 345/173 |
| 8,355,039 | B2 * | 1/2013 | Michrowski | H04N 5/272 348/14.01 |
| 2001/0024512 | A1 * | 9/2001 | Yoronka | G06K 9/00335 382/103 |
| 2008/0297588 | A1 * | 12/2008 | Kurtz | H04N 7/147 348/14.08 |
| 2008/0303643 | A1 * | 12/2008 | Ishida | H04M 1/6058 340/332 |

(Continued)

FOREIGN PATENT DOCUMENTS

EP 2515526 A2 10/2012

OTHER PUBLICATIONS

"How Does Magisto Work", http://www.magisto.com, accessed Jan. 8, 2014.

(Continued)

*Primary Examiner* — Utpal Shah
(74) *Attorney, Agent, or Firm* — IP Spring

(57) ABSTRACT

Implementations relate to self-initiated changing of appearance of subjects in video and images. In some implementations, a method includes receiving at least one captured image, the image depicting a physical scene. The method determines that an input command provided by one or more subjects depicted in the image has been received. The input command instructs a change in visual appearance of at least a portion of the subjects in the image. The method changes the visual appearance in the image of the at least a portion of the subjects in accordance with the input command.

17 Claims, 11 Drawing Sheets

(56) References Cited

U.S. PATENT DOCUMENTS

| | | | |
|---|---|---|---|
| 2013/0124207 A1* | 5/2013 | Sarin | G10L 15/22 704/275 |
| 2013/0286004 A1* | 10/2013 | McCulloch | G06T 19/006 345/419 |
| 2014/0109231 A1* | 4/2014 | Takaoka | G06F 21/60 726/26 |
| 2014/0112533 A1* | 4/2014 | Wang | G08B 13/19608 382/103 |
| 2014/0267311 A1* | 9/2014 | Evertt | G06F 3/011 345/473 |
| 2014/0267409 A1* | 9/2014 | Fein | G06T 11/00 345/633 |
| 2014/0267410 A1* | 9/2014 | Fein | G06F 17/30 345/633 |
| 2014/0267411 A1* | 9/2014 | Fein | G06T 11/00 345/633 |
| 2015/0022617 A1* | 1/2015 | Le | G06F 3/017 348/14.02 |
| 2015/0201124 A1* | 7/2015 | Litvak | H04N 5/23219 348/77 |

OTHER PUBLICATIONS

Schiff, Jeremy et al. "Respectful Cameras: Detecting Visual Markers in Real-Time to Address Privacy Concerns." Intelligent Robots and Systems, 2007. IROS 2007. IEEE/RSJ International Conference on, IEEE. Piscataway, New Jersey. pp. 971-978. Oct. 29, 2007.

Barhm, Mukhtaj S. et al. "Negotiating Privacy Preferences in Video Surveillance Systems." Modern Approaches in Applied Intelligence. Springer Berlin Heidelberg, Berlin. pp. 511-521. Jun. 28, 2011.

Dabrowski, Adrian et al. "Framework Based on Privacy Policy Hiding for Preventing Unauthorized Face Image Processing." 2013 IEEE International Conference on Systems, Man, and Cybernetics. IEEE. pp. 455-461. Oct. 13, 2013.

European Patent Office. International Search Report and Written Opinion for related International Patent Application No. PCT/US2015/011445. 12 pages. Jul. 28, 2015.

International Bureau of WIPO, International Preliminary Report on Patentability for International Patent Application No. PCT/US2015/011445, Aug. 11, 2016, 8 pages.

* cited by examiner

SELF-INITIATED CHANGE OF APPEARANCE FOR SUBJECTS IN VIDEO AND IMAGES

BACKGROUND

The popularity and convenience of digital cameras as well as the widespread of use of Internet communications have caused digital images and video to become ubiquitous. For example, user-produced digital photographs and videos are posted to various Internet sites, such as web pages, social networking services, content sharing services, etc. for other users to view. Many images and videos may depict a person without that person's knowledge or consent, or may be posted, distributed, or made available to others in ways not known or consented to by the person.

SUMMARY

Implementations of the present application relate to self-initiated change of appearance for subjects in video and images. In some implementations, a method includes receiving at least one captured image, the image depicting a physical scene. The method determines that an input command provided by one or more subjects depicted in the image has been received. The input command instructs a change in visual appearance of at least a portion of the subjects in the image. The method changes the visual appearance of the subjects in the image in accordance with the input command.

Various implementations and examples of the method are described. For example, the one or more subjects depicted in the image can include one or more persons, and determining that an input command has been received can include determining that at least one of the persons has provided the input command using an electronic device, where the input command is a signal external to the image. Such an implementation can also include determining an identity of at least one subject using object recognition and determining that the associated identity has sent the input command from the device. Determining that an input command has been received can include determining that the subjects depicted in the image have provided the input command as an image command that appears in the image. For example, the image command can include a distinctive indicator located on at least one of the subjects in the image, and/or can include a body sign or gesture formed with one or more body parts of subject person(s). The input command can be a detected voice command spoken by at least one of the subjects, and the method can determine that the at least one of the subjects providing the voice command is located in the image. The method can further include determining a location of at least one of the subjects in the image by using one or more signals obtained from a locator device physically located on the at least one of the subjects during the capture of the image.

The method can further include receiving a plurality of images depicting the physical scene over time, and changing the visual appearance in a set of the stored plurality of images based on the input command, where the stored plurality of images are provided for output in sequence as a video. Changing the visual appearance can include obscuring at least a portion of the subjects providing the input command by modifying pixels in the image. Obscuring at least a portion of the subjects can include changing a subject (or portion thereof) to be transparent or translucent in the image, including placing a previously-captured or estimated background portion of the physical scene over a portion corresponding to the subject. Changing the visual appearance can be performed for only a portion of the subjects, e.g., if so instructed. In some implementations, changing the visual appearance can be performed by a local device that captures the image, and the method can further include causing the changed image to be sent to a remote server device over a network. The method can further include determining that the subject has provided a second input command instructing to remove the change of appearance, and removing the change to restore an original appearance of the image.

A method includes, in some implementations, capturing and storing a sequence of images depicting a physical scene, analyzing at least one image of the sequence of images, and detecting one or more visual commands appearing in the image. Each visual command is provided by one or more persons depicted in the image, and instructs a change in visual appearance of at least a portion of the associated subject in the image. The method obscures the visual appearance of the persons in accordance with the visual commands, and the visual appearance is obscured in at least one or more images following the image in the sequence.

In some implementations, a system can include a storage device and at least one processor accessing the storage device and operative to perform operations. The operations include receiving at least one captured image, the image depicting a physical scene. The operations determine that an input command provided by one or more subjects depicted in the image has been received, where the input command instructs a change in visual appearance of at least a portion of the one or more subjects in the image. The operations change the visual appearance in the image of the one or more subjects in accordance with the input command.

In various implementations of the system, changing the visual appearance can include obscuring at least a portion of the subjects in the image by modifying pixels in the image. The one or more subjects depicted in the image can include one or more persons, and determining that an input command has been received can include determining that at least one of the persons has provided the input command using an electronic device, where the input command is a signal external to the at least one image. Determining that an input command has been received can include determining that the subjects depicted in the image have provided the input command as an image command that appears in the image. The operations can further include determining a location of at least one of the subjects in the image by using one or more signals obtained from a locator device physically located on the subject during the capture of the image.

DETAILED DESCRIPTION

Figure 1:
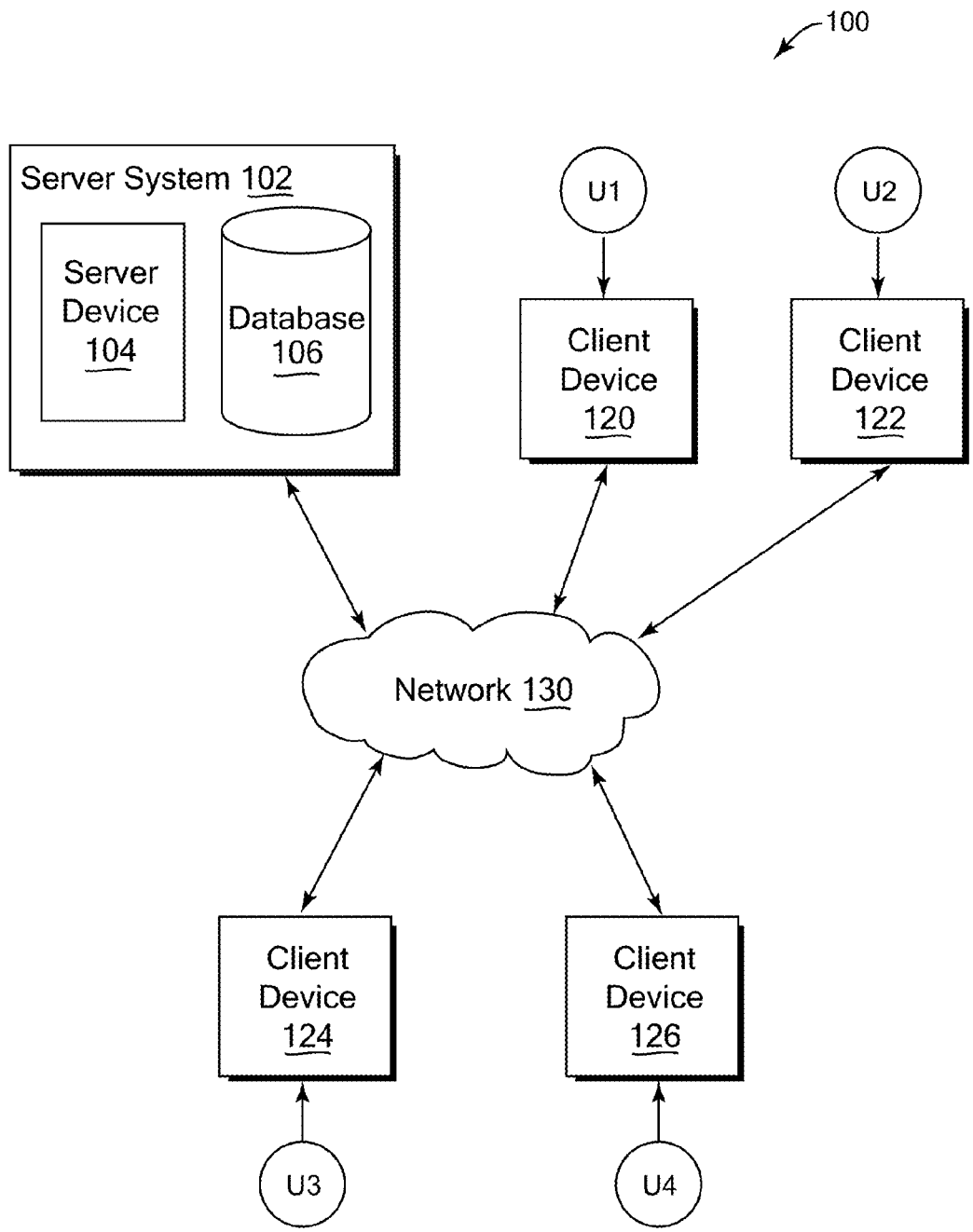
FIG. 1 is a block diagram of an example network environment which may be used for one or more implementations described herein.

One or more implementations described herein relate to self-initiated changes of appearance for subjects in video and images. Various implementations allow changing the visual appearance of subjects in video and images as initiated and commanded by those subjects. The system determines that an input command has been received by one or more subjects depicted in captured images, where the input instructs a change in visual appearance to those subjects, and the system correspondingly changes the appearance of the subjects in the images. Such changes in appearance can include obscuring the appearance of subjects to mask their identities, for example. For example, these features can provide privacy options to subjects to control their appearance in video and pictures that may be distributed publicly.

In example implementations, the system can capture and store one or more images depicting a physical scene. The images can be still images or frames in a video sequence. The system determines that an input command has been received, where the input is provided by one or more subjects depicted in the images. For example, the subjects can be persons, or alternatively can be other objects. The input command instructs a change in visual appearance of at least a portion of the subjects in the images. The input command can take a variety of forms in various implementations. For example, a subject can provide image commands detectable in the captured images, such as a hand or body sign or gesture, or a distinctive indicator on his or her person. The input command can be a device command, such as a signal output by a device operated by the subject, or a sound or voice command emitted by the subject. The input command can be received before, during, and/or after the capture of the images in various cases.

After receiving the input command and determining that the commanding subject is located in the image, the system changes the visual appearance of each commanding subject in the image. In some implementations, the change in visual appearance is an obscuring of the subject within the image, such as making a subject transparent or invisible, translucent, blurred, pixelated with a pattern, or otherwise obscured in appearance. Some implementations can obscure a portion of a subject, such as only a person's face. Other implementations can obscure all subjects in the images and the change in appearance is a revealing of those subjects that provide the input command. After changing the appearance of the subjects, the system can send a processed image to be output, stored, or distributed. In various implementations, a locator device can be carried by subjects in the image, and this device can be electronically tracked by the system to assist in locating and/or determining subjects or pixels in the images to change in appearance. Some implementations can recognize an identity of a subject in an image using facial or other type of object recognition to locate the subject or pixels to change.

Disclosed features can allow a person or user to control their appearance, or the appearance of other subjects, in live or previously-recorded video and pictures that may be distributed publicly. For example, a subject of an image can actively command a camera device to remove or obscure them in any captured images before those images are output, e.g., as live video or pictures. For example, this can provide privacy options to persons who do not wish to be included in images captured by others, which can be a significant benefit to users who may not wish to be captured in images taken by portable and hidden cameras. Furthermore, subjects can command devices to add effects to their image appearance for entertainment or other reasons. A technical effect of enabling a subject to initiate a change in appearance in images as disclosed herein includes providing users with privacy options for their appearance in images captured by compliant devices. Another technical effect is automatically changing those appearances in an image before the image is output or distributed, thus saving users time, energy, and resources in changing such appearances manually.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, display glasses or goggles, wristwatch or other wearable electronic device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a service implemented on server system 102, where respective client devices 120, 122, 124, and 126 transmit communications and data to one or more server systems such as system 102, and the server system 102 provides appropriate data to the client devices such that each client device can receive content uploaded to the service via the server system 102. For example, the service can be a social network service, content sharing service, or other service allowing communication features. In some examples, the service can allow users to perform a variety of communications, form links and associations, upload, post and/or share content such as images, video streams, audio recordings, text, etc. For example, the service can allow a user to send messages to particular or multiple other users, form social links or groups in the form of associations to other users within the service or system, post or send content including text, images, video sequences, audio sequences or recordings, or other types of content for access by designated sets of users of the service, send multimedia information and other information to other users of the service, participate in live video chat, audio chat, and/or text chat or teleconferencing with other users of the service, etc.

A user interface can enable display of images, video, and other content as well as communications, privacy settings, preferences, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
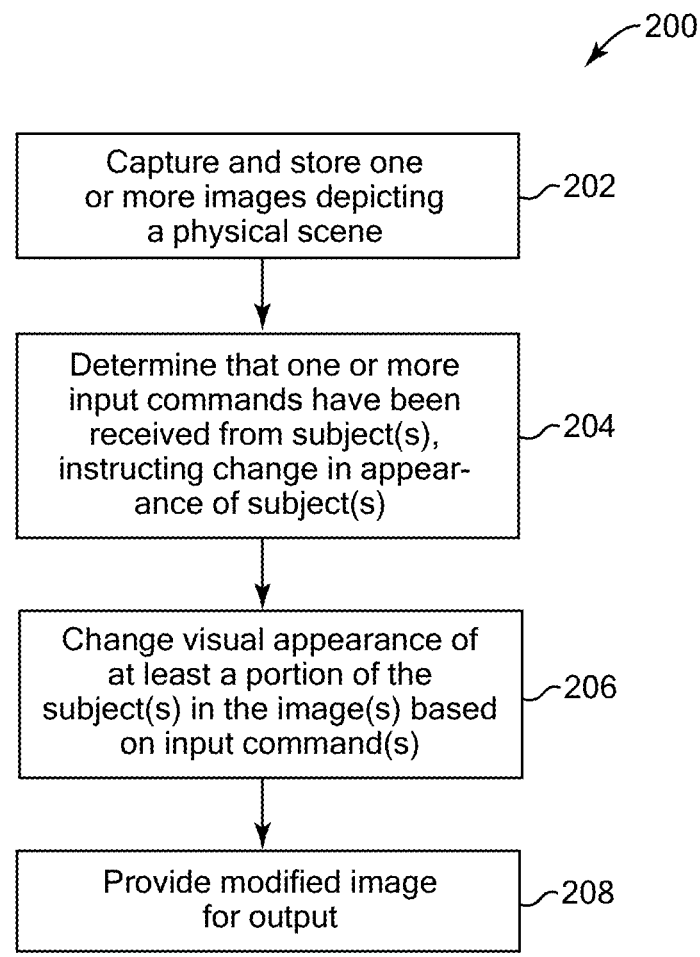
FIG. 2 is a flow diagram illustrating an example method for enabling self-initiated changes of appearance for subjects in video and images, according to some implementations.

FIG. 2 is a flow diagram illustrating one example of a method 200 for enabling self-initiated change of appearance for subjects in video and images. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

The method 200 can be performed as part of or component of an application running on the system, or as an application or software running in conjunction with other applications and operating system.

In some implementations, method 200 can be initiated based on user input. A user may, for example, have selected the initiation of the method 200 from an interface such as an application interface, web page, social networking interface, or other interface. In other implementations, the method 200 can be initiated automatically by a system. For example, the method 200 (or parts thereof) can be performed whenever a user comes into view of a camera or other image-capturing device, or can be performed based on one or more particular events or conditions such as a particular user coming into view, receiving a particular command, etc. In some implementations, such conditions can be specified by a user in custom preferences of the user having control over the camera device. In one non-limiting example, method 200 (or parts thereof) can be performed on a client device such as a camera, cell phone, or other client device that has captured one or more images. In addition or alternatively, the client device can send images to a server over a network, and the server can process the images using method 200.

In block 202 of method 200, the method captures and stores one or more images depicting a physical scene. Each image can be a digital image composed of multiple pixels, for example, and can be stored on one or more storage devices of the system or otherwise accessible to the system, such as a connected storage device, e.g., a local storage device or storage device connected over a network. An image can be captured using one or more image-capture devices, referred to generally as "cameras" herein, which can include any type of device that includes a camera, and where the camera can be of any of various types. The camera can capture visual images depicting the physical scene, such as still images or video streams of successive multiple images over time. In some implementations, the camera can also capture other types of images using other types of light or electromagnetic radiation, such as infrared images, ultraviolet images, etc. In various implementations, the camera can be stationary or moving, or some cameras can be stationary and others moving if multiple cameras are used.

The captured image depicts one or more subjects that are present within the physical scene in the recorded view of the particular camera capturing the images (e.g., physical site or location, geographic location, etc.). A subject can be any of a variety of different types of objects that, in some implementations, are generally closer to and in the foreground of the image, as opposed to background objects further away from the camera. For example, a subject can be a person partially or completely depicted in the image. In some implementations, another type of subject can be faces of people, and/or individual facial features in some implementations. In other examples, the type of subject can be an animal, plant, or item such as a vehicle (car, boat, etc.), article or item (bottle, pen, phone, chair, etc.), or building or other structure. In other examples, the type of subject can be a landscape feature, such as a mountainside, group of trees, area covered by grass, etc. For some types of subjects and input commands, a user associated with the subject can provide an input command for the subject.

In block 204, the method determines that one or more input commands have been received from one or more subjects depicted in the image, where each input command instructs the change in the visual appearance of the subject that provided the command. Each input command can take a variety of different forms and be of various types in various implementations. Herein, each "type" of input command refers to a different method of providing the input command by a subject which is received by a system implementing method 200. For example, the input command can be conveyed as a sign or indicator within a captured image. In some implementations, the input command can be provided as a separate device command from a device currently or previously used by a subject in the image. In some implementations, the input command can be provided via sound emitted by the subject. Some examples of input command types are described in greater detail below with reference to FIG. 3. In general, the input command is intended to be a command by the commanding subject (or associated user), and is not incidentally or unknowingly provided. For example, the command is not based on one or more sensed inherent characteristics of a subject. In some implementations, block 204 can include locating within the captured image the subject that provided the received input command, e.g., in some cases to confirm that the received input command was provided by a subject located in the captured image. Some examples of locating the subject are described in FIG. 3.

In block 206, the method changes the visual appearance of at least a portion of the subject(s) in the image based on the received input command(s) to produce a modified image. The change of visual appearance can include any of a variety of different modifications to the image in various implementations, such as obscuring a depicted subject or a portion of that subject. Such obscuring can include making a depicted subject transparent, translucent, or otherwise obscured and/or unrecognizable to a typical viewer of the image. This obscuring is performed on the portion (e.g., pixels) of the image depicting the subject while keeping the rest of image unobscured and unmodified. In other implementations, the change of visual appearance in block 206 can include revealing (e.g., making visible and/or recognizable) a previously-obscured subject in the image. Some examples of changes in visual appearance are described in greater detail below with respect to FIG. 4.

In block 208, the method provides the modified image for output. The image can be output in any suitable form, such as display on a display device, printout by printing device, etc. The modified image can be transmitted to other devices for output. For example, if method 200 is performed on a client device, the client device can provide the modified image to a server, which then distributes the modified image to be displayed by others, e.g., over a network as part of a social network service, content distribution service, etc. In this way, the image as originally captured is not displayed or distributed, and only the modified image is presented to other users who only view the image with the subject having a changed appearance. In one example, this allows the subject to maintain privacy by providing a command to obscure himself or herself in the image before it is distributed or output. In other implementations, a client device can send captured images to a server, which can then perform method 200 of the image such that the modified image is stored or output from the server, or is sent back to the client device. Some implementations can delete the original captured image and only provide or store the modified image. Other implementations can retain the original image as well as the modified image.

In some implementations, multiple images can be captured over time. For example, the multiple images can be ordered in a sequence corresponding to the order of capture to provide a video stream. For example, the visual appearance of a subject can be changed in a set of images of the video stream, such as one or more successive frames after a frame with which an input command is associated. If a sequence of images such as a video is being captured in method 200, then the method can return to block 202 to capture an additional image, and so on in further iterations. In such further iterations of method 200, block 204 can include a check whether additional input commands have been received by other subjects or by the same subjects previously providing input commands. Some examples for a video implementation are described below with reference to FIG. 5.

In some implementations, if a subject does not provide any later commands, that subject's appearance is continued to be changed in any later images of the scene (or of any scene, in some cases) that is captured after the input command is received. Other implementations can consider an input command to be effective only for the next image (or next predetermined number of images) captured after that input command is received. In some implementations, if a subject provides a second input command, the second command can act as a toggle to turn off the change of appearance that was initiated based on a previous, first input command. The second command can be the same as the first command, or can be its own distinct command, in various implementations.

In some implementations, different and distinctive input commands can be provided by a subject to instruct the activation and deactivation of appearance changes, and/or to instruct different types of changes in appearance of the subject. In one example, one command can be used to make a subject transparent, a different command can be used to make the subject translucent, a fourth command can be used to make the subject have a pixelated appearance, a fourth command can be used to make only a subject's face pixelated, and a fifth command can be used to turn off any changes in appearance for the subject so that the image is output in its original captured state.

In some implementations, an input command from a subject can be received and acted on by multiple systems or devices in range of receiving the input commands, where each receiving system can perform method 200. In other implementations, an input command can be directed only to one or more particular systems that perform method 200, e.g., via a wired connection, an encoded wireless signal, a customized image command or sound command, etc.

Figure 3:
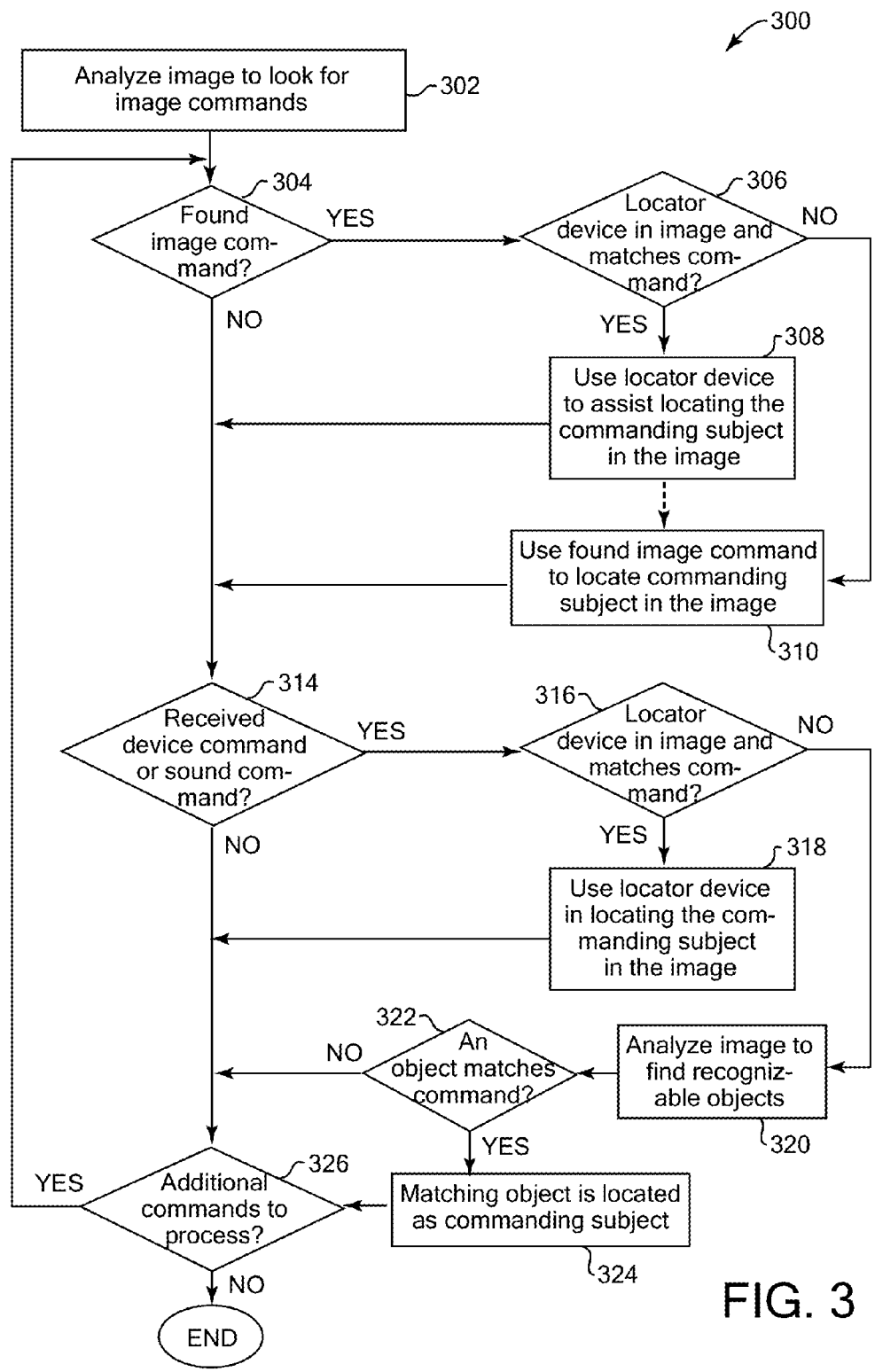
FIG. 3 is a flow diagram illustrating an example method for implementing a block of FIG. 2 in which the method determines that an input command has been received from a subject depicted in a captured image.

FIG. 3 is a flow diagram illustrating an example method 300 implementing block 204 of FIG. 2, in which the method determines that an input command has been received from a subject depicted in the captured image.

In block 302, the method analyzes the captured image(s) to look for image commands in the image. Herein, "image commands" refer to any types of input commands that are received by detecting the command appearing within the captured image. For example, some image commands are visual commands which are visually provided within an image. Other types of image commands may be provided in an image using other forms of light, such as infrared. If the method looks over the image and detects an image command therein, then the method considers an image command to have been received.

One type of image command is a body sign, which is a distinctive sign formed with one or more body parts (or the entire body) of a person or persons. For example, a body sign can include a hand sign formed with one or more hands of a person. In some examples, a hand sign can be one or more fingers of a hand extended while the other fingers of the hand are folded, pointing fingers or hands in particular directions, creating particular shapes with fingers, etc. In another example, multiple hands can form an image command, such as multiple hands of one person or of multiple people. Some implementations can use a hand classifier enabled from machine learning techniques, and/or can use other techniques for recognizing hand signs. In other implementations, the image command can be formed by other body parts of a person, such as leg(s), foot (or feet), or head. Some implementations can examine a pose of an entire body of a person (or multiple people) to detect an image command, such as a body pose having the head, arms, and/or legs in one or more particular predetermined positions. A body classifier can be used for recognizing such body commands, in some examples.

In some implementations, multiple images are captured in sequence over time, such as in a video stream of frames, where a frame is an individual still image. In some of these implementations, the image command can be a gesture, which is a distinctive motion or series of body signs made by a body part such as a hand or entire body over time as captured by a sequence of images. Some examples of gesture image commands are described below with reference to FIGS. 6-14. Some implementations can use a full body tracker to recognize and track movement of a body of a person over multiple images.

Another type of image command is a distinctive indicator located in the image. For example, the indicator can be provided via visible light. The method can examine the image for one or more of these indicators to determine whether one or more subjects has provided an image command. In some examples, the visual indicator can be a particular object, shape, color, marker, sign, etc., or a combination of two more of these. Or, the visual indicator can be a recognizable object worn or held by a subject person, such as a particularly-shaped hat, shirt, shoe, cup or mug, glasses, armband, jewelry, watch, scarf, cloak, cane, umbrella, phone, a ball, cube (or other handheld object), etc., having a distinctive shape that is recognizable in the image. In some implementations, an object can have a particular color that indicates it is providing an input command, such as a particular shade of orange, yellow, green, or other color. In some implementations, a marker or sign provided on the subject can provide the image command, such as a particular logo on a shirt or other article of clothing, a tattoo, a marker on a held object, etc. Some implementations can use a fiducial marker, such as a bar code or QR Code (quick response code), which can be visible on the subject and can encode information indicating it is an input command intended to change the appearance of a subject. A combination of such indicators can also indicate an image command has been provided, such as a particularly-shaped hat having a particular color. A subject thus decides to provide the image command by wearing or holding the distinctive indicator(s). In some implementations, the subject need not be a person, and can be an object or animal that is marked with one or more distinctive indicators indicating that the object or animal is providing the image command to change its appearance in the image.

In some implementations, non-visible light can be used to detect an image command. For example, in block 202 of FIG. 2 a camera can capture both a normal visible light image and a corresponding non-visible light image of a scene. For example, a non-visible light scenes can be generated using active techniques in some implementations, such as projectors, light emitting diodes (LEDs), screens, etc., and/or passive techniques, such as IR-absorbent fabrics or other materials provided on subjects. Some cameras, such as some types of webcams, can detect infrared light by removing an IR filter. In one example using infrared light, a subject can wear or hold a particular distinctive indicator that is visible only in the non-visible light used by the camera, or which absorbs the non-visible light. For example, a particular shirt can be made of a material that absorbs infrared light, and a subject person can wear the shirt to provide the image command. An infrared image taken by the camera can project infrared light beams into the physical scene being captured, where the particular shirt absorbs the beams while the other objects in the scene reflect the beams. In the captured infrared image, the shirt appears as a "hole" or black space, which is detected as an image command. In some implementations, a non-visible light image can be used to detect body signs as image commands, as described above, where the signing body parts are detected in the non-visible light.

In some implementations, the subject (or a user associated with the subject) can provide preferences or settings that can be obtained before the performance of method 300 and that indicate the desired sign(s), gesture(s), and/or distinctive indicator(s), or combinations thereof, that will function to provide an image command. Furthermore, different image commands can be specified to command different types of changes in appearance in images. For example, such preferences or settings can be obtained by the method 300 before the capture of images in block 202 of FIG. 2.

In block 304, the method checks whether one or more image commands were found in the image(s) based on block 302. For example, any of the types of image commands described above can be found. If no image commands were found, then the method continues to block 314, described below. If one or more image commands were found, then in block 306 the method checks whether a locator device is present in the image, and whether that locator device matches the found image command. In some implementations, locating a subject in the image and correlating the subject to an image command can be assisted using a signal from a locator device located on the subject (e.g., device localization). For example, a locator device signal can be output by the locator device and received by the system in communication with method 300. A locator device can also be used to reduce errors in locating the subject in particular conditions. For example, if several people are in the captured scene, it may be difficult to locate a subject person that provided a particular image command, and the locator device signal be used to remove or reduce any ambiguity as to which subject provided the command.

In various implementations, the locator device can be any of a variety of different types of devices. For example, the locator device can be a cell phone, tablet computer, or other portable computer carried or worn by the subject. In some implementations, the locator device can be any electronic device (e.g., chip, or circuit) worn or carried by a subject and which can emit one or more locator signals, such as a device within a watch, ring, jewelry, sewn into clothing or carried in a pocket, etc. Such a device can emit one or more signals allowing the method 300 to locate the device in physical space with reference to the image view of the captured scene. In some implementations, sensors and/or transmitters within the locator device can transmit location information allowing method 300 to locate the locator device in the scene. For example, GPS sensors within the locator device can provide a geographical location. In some implementations, inertial sensors of the device (e.g., accelerometers and/or gyroscopes) can provide signals indicating the motion of the locator device, which can be used to assist tracking a subject over multiple images (such as video). In addition, some implementations can examine wireless network (e.g., WiFi) signals used in communications between the locator device and wireless access points located at or near the captured physical scene. For example, the strength of the wireless signals can be analyzed to determine the distance of the locator device from the wireless access points to locate the locator device in the image (e.g., using triangulation). In some implementations, sound emitted from the locator device can be detected by various sensors (e.g., microphones) positioned in or near the captured scene and used to locate the locator device within the scene. Once the locator device is located in the scene, the location of the subject that provided the image command is also known, since it is assumed that the locator device is located on the subject. In some implementations, a different system or method can determine a physical location of the locator device, and send a determined location to the method 300 which can map that physical location to a location in the image.

If a locator device is present in the image, in some implementations the method also can determine whether the detected locator device matches the received image command. This may be needed in cases where multiple subjects are wearing locator devices such that multiple locator devices are detected in the image, and the method 300 should determine which locator device is located on the subject in the image that provided the image command (i.e., the "commanding subject"). In some implementations, the method can examine the image to determine which detected locator device is located on the commanding subject. For example, in some implementations the locator device can be located precisely to determine which subject in the image corresponds to the device's location, e.g., by recognizing a subject or portion thereof in the image at the location of the device. In some implementations, the method can perform object recognition (such as facial recognition) on subjects in the image to determine identities of the recognized subjects, and can compare recognized subject identities from the image with identities included in particular locator signals to find the match, as also described below for blocks 320-324. In some implementations such as video, the method can look for movement of pixels in the scene over multiple frames, the movement correlated to detected movement of the locator device (e.g., based on motion sensors of the device) to find the subject in the image. For example, in some implementations such correlated moving pixels can be part of a body sign or distinctive indicator found as described above. In some implementations, the locator device itself can have markings and is a distinctive indicator such that it can be visually detected in the scene if worn or held such that the camera can view it. Once the match is established, the method 300 knows which particular detector signal is associated with the particular commanding subject in the image.

If a locator device is in the image and matches the received image command, then in block 308 the method uses that locator device to locate the commanding subject in the image. For example, the location in the image of the locator device can be used as a starting location of the subject for determining subject pixels in FIG. 4. The method then continues to block 314, detailed below. In other implementations, the method can continue to block 310 from block 308, where the locator device location is used in conjunction with using the image command (and/or other technique) to find the commanding subject's location in the image, e.g., as a confirmation or check of the device location.

If no locator device was found in block 306, then in block 310, the method uses the detected image command to locate the commanding subject in the captured image. The location of the detected image command directly locates the subject in the image. For example, a subject is often physically connected or contiguous to the image command detected within the image and is readily correlated to the image command. In one example, a subject person who provides a hand sign as an image command is visually connected to the hand providing the detected hand sign, or a subject person who wears a distinctive indicator typically surrounds or is contiguous to the indicator in the image. Other techniques can also or alternatively be used to more robustly locate the subject in the image (e.g., if it is not clear which subject is connected to an image command), such as techniques described below. The method then continues to block 314, detailed below.

In block 314, the method checks whether a device command or a sound command has been received. A "device command" as referred to herein is a signal or command received from an electronic device used by the subject providing the input command (the "commanding subject"), where the signal is separate from or external to the captured image. The device can be any type of device which a subject can use to send an input command to the method 402. For example, the device can be a cell phone, tablet computer, laptop computer, desktop computer, game console or entertainment device, wearable device, or any other type of device which can receive input from the subject and send an input command to the system implementing method 300. In some implementations, the device can be same device used as a locator device as described herein (e.g., worn or located on the commanding subject). In various examples, the device command can be received as a wireless signal, e.g., using a wireless network (e.g., cell phone network or WiFi), or can be received from a wired connection, e.g. via a network or communication cable. In some implementations, the device command is received by method 300 as a signal or data from one or more intermediary devices (e.g., server, client, etc.) which received the command from a device used by the subject or a user associated with the subject.

The device command instructs a change the appearance of the commanding subject in the captured image. In some implementations, an identity of the commanding subject is included in (or can be otherwise derived from) the device command. For example, in some implementations the received signal includes the device command and an identification of a particular person or user which uniquely identifies the person, indicates that person's identity, and distinguishes the subject person from other subjects which may provide device commands. In some implementations, no identification is needed, e.g., if only one subject in an image has the ability to provide device commands to the method 300, and thus any received device command is associated only with that subject.

In various environments, the device command can be received at a time prior to the capture of the image. In some implementations, the device command can be received at any length of time prior to the capture of the image, where the device command is stored and the method waits for the next image to be captured in block 202. In other implementations, the device command must be received within a predetermined period of time prior to the capture of the next image in order for the command to be effective to change the appearance of the subject. In some implementations, the device command can be received after the capture of the image but before the processing of block 314. In some implementations in which multiple images are captured (e.g., video), the method can consider the device command for the next image captured in the sequence of captured images.

The method can also check in block 314 whether an input command in the form of a sound command was received. A sound command is conveyed as sound waves. The sound command can be received before or during the capture of the image, or after the capture of the image and before the performance of block 402. For example, a sound command can be received just before the capture of the image in block 202, or during the image capture, at one or more microphones present at the physical scene captured in the image and in communication (directly or indirectly) with method 300. In other implementations, the sound command can be received further back in time before the capture of the image, e.g., in some implementations within a predetermined limit as described above for device commands. Similarly to the device command, in some implementations the sound command can be stored until the next image is captured and then considered effective for that image.

The sound command can be provided with sound waves of any frequency, e.g., within the human hearing range and/or outside that range (ultrasonic, etc.). In some implementations, the sound command is a voice command, such as a spoken word, phrase, or other sound emitted by a voice of a person. In other implementations, a sound command can be emitted by a device or other object (clapping of hands, whistle, musical instrument, striking two objects together, etc.), such as a distinctive sound or sequence of sounds. In some implementations, an identity of the commanding subject can be determined from the sound command, e.g., to distinguish the commanding subject from other subjects which have provided, or may be able to provide, sound commands. For example, the identity of the commanding subject person can be determined based on extracting and analyzing the sound characteristics of a spoken voice command for distinguishing characteristics. The method can compare the voice characteristics to reference characteristics in a database which are associated with particular identities, thereby determining the identity of the subject person emitting the voice command.

In block 316, the method checks whether a locator device was present in the physical scene at the time that the image was captured, and whether this device matches the input command (e.g., device command or sound command) received and found in block 314. The locator device can be used to determine whether a person sending the device command is a subject located in the captured image (or whether the sending person is associated with a subject located in the captured image, such as an object owned by a person sending the device command). This locator device can be similar to the locator device described above in block 306, e.g., can provide signals of one or more various types (and/or visible indicator) to allow the method to determine physical location of the device at the time the image was captured, and thus locate the locator device in the image. The locator device can also provide identification information that allows method 300 to compare an identity associated with the locator device to an identity associated with the input command. For example, a device command can include identification information, or a sound command may have been recognized as belonging to a particular identity as described above.

If the identities associated with the locator device and the input command match, and the locator device was present in the physical scene at the time of image capture, then it has been established that the person that sent the input command is located in the captured scene. If this is the case, then in block 318, the method locates the commanding subject in the captured image by using the determined physical location of the locator device. The method then continues to block 326, described below. In other implementations, the method can continue to block 320 from block 318, where the locator device location is used in conjunction with one or more other ways to find the commanding subject's location in the image.

In some implementations, if the input command is a sound command, sound localization techniques can be used instead of device localization in block 318. For example, one or more sensors (e.g., microphones) at the physical scene can estimate the location of the subject in the scene that emitted the sound command by measuring the sound waves at different locations and using triangulation. A subject emitting a sound command can thus be located in the scene using such techniques.

If the check of block 316 is negative, the method can check in other ways whether the subject that sent the input command is located in the captured image. In the example of method 300, the method continues to block 320, in which the image is analyzed to recognize one or more objects, such as faces or other objects, to determine the identities of those objects. For example, the method can use facial recognition techniques or other object recognition techniques to determine the identities of persons or other objects in the captured image. These identities can be accessed by the method 300 from a database or other data source which correlates facial characteristics and/or other characteristics to known identities of persons or objects. For example, a social networking service or other online service can be accessed to find identity data correlated to facial characteristics or other characteristics.

In block 322, the method compares the identities of the objects recognized in the image to an identity associated with the received input command. If the identity associated with the input command matches an identity recognized in the image, then it is established that the subject that sent the input command is located in the captured image.

In some implementations, a voice type of sound command can be correlated with a subject in the image by examining the image(s) for a person's mouth that is partially open, implying that such a subject spoke the voice command. In video implementations using multiple images, the method can examine multiple images for a person's mouth open at a time synchronized with the received voice command. For example, mouths can be detected in the image using facial recognition techniques. In some implementations, a subject can wear or carry a distinctive identity marker visible in the image, which can be recognized by the method to establish a subject's location and/or identity. This can be similar to the distinctive indicator described above (e.g., a logo, color, article of clothing, etc.). However, this marker is not providing an image command, but is used to locate and establish an associated subject's identity (and/or can be used to track a subject over multiple successive images, e.g., in a video).

The method continues to block 324 to locate the subject in the captured image, which in this case is the location of the matching recognized object in the image. The method then continues to block 326.

In other implementations, other techniques can additionally or alternatively be used to locate the subject in the image. For example, device-free localization techniques can be used to determine whether a subject is located in the scene. For example, changes in sound waves, Bluetooth wireless signals, Wi-Fi networking signals, or other signals transmitted in the scene can be detected as a subject moves, and the changing of these signals can be measured and used to estimate subject location. In some implementations, the processing needed to locate a subject in the image (using a locator device or any other technique) can be sent to a server from a client device that is processing the other parts of method 300, and the server can send the location results back to the client device.

In block 326, the method checks whether there are additional input commands process. If so, the method returns block 304 to process the next input command. If there are no more input commands the process, the method ends.

Some implementations of the method 300 can allow an input command to be defined as a combination of one or more of the types of input commands described above. For example, an input command can be defined as a combination of an image command (e.g., a hand gesture) and a sound command (e.g., a voice command providing a particular word or phrase).

Figure 4:
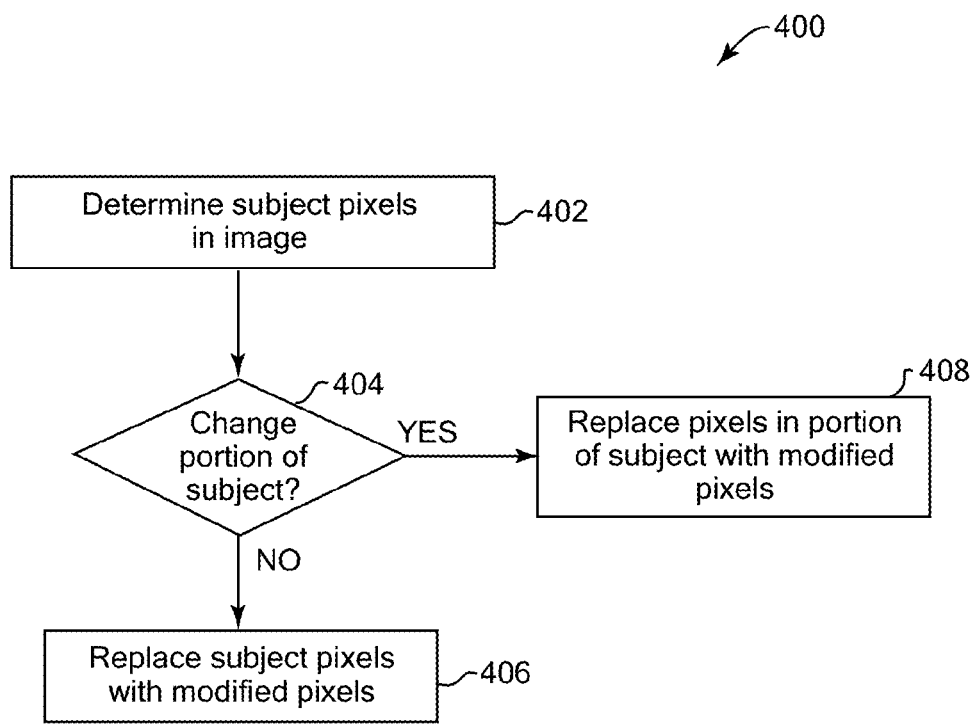
FIG. 4 is a flow diagram illustrating an example method for implementing a block of FIG. 2 in which the visual appearance of a least a portion of the commanding subjects in the image is changed.

FIG. 4 is a flow diagram illustrating an example method 400 implementing block 206 of FIG. 2, in which the visual appearance of a least a portion of the subjects in the image that have provided an input command are changed.

In block 402, the method determines the pixels in the image that belong to each subject that provided an input command. In general, the method can start with the previously-determined location of the commanding subject, e.g., as located in method 300 of FIG. 3. This starting location can be different in different implementations. For example, the starting location can be a detected image command, such as a hand sign or distinctive indicator in the image. The starting location can be a location determined from a locator device as described above. The starting location can also be a location of a recognized face, facial feature, or other portion of an object. Or, a combination of multiple of these techniques may have been used.

Starting from the known location, the method can determine the pixels of the located subject by recognizing or classifying the spatial extent of the subject within the image, in some implementations. For example, the method can use a skeletal classifier, body classifier, face classifier, or other object classifier. Such classifiers can be implemented using machine learning techniques, where a classifier procedure is trained by examining a large number of examples. In some implementations, face or body recognition can be used to locate all the pixels in the image belonging to a subject person, which looks for arrangements of particular body or facial features (eyes, nose, mouth, hands, etc.). Similarly, an object classifier or object recognition can be used to locate all the pixels in the image belonging to an object such as a non-person subject. In some implementations, the method can look for pixels in the image that are contiguous to the known starting location and which fit an object as determined by an object classifier (e.g., a body shape). Some implementations can use optical flow techniques to, for example, detect objects and/or find which pixels are in motion over a series of images (e.g., video) to find the subject pixels.

In some implementations, the pixels of a foreground subject can be located, or assisted in being located, in an image by using a depth map (e.g., depth image) of the captured scene. Such a depth map can be obtained, for example, by using a camera having an ability to sense "depth" of objects or pixels in the scene, where the depth is the distance of each object to the camera capturing the scene.

For example, a depth map can be generated using a 3-D or stereo camera, structured light camera, time-of-flight camera, or other type of depth-sensing camera (using visible and/or non-visible light). A depth map image can be captured simultaneously with the capture of a visual image of the scene, for example. In some examples, a structured light camera can project out beams of light, such as infrared or other forms of light, onto the scene and measure the reflections of the beams to determine the distance or depth of objects in the scene (and/or the depth of each pixel in an image) relative to the beam emitter or camera lens. By examining such depth information for the pixels of the captured image, the method can locate foreground objects or pixels that are closer to the camera as well as background objects or pixels that are further away. Since a subject is likely to be a foreground object, this can assist the method in locating the subject pixels in the foreground and associated with the determined subject location in the image. In another example, the method can assign any pixel to the background which hasn't changed within a predetermined amount of time, and assign the remaining pixels to the foreground.

In some implementations using multiple captured images, such as video streams of images, the pixels belonging to the subject can be determined based on comparing the current captured image to one or more previous captured images. For example, subject pixels present in a previous image can be tracked in a current image by finding pixel values in the current image similar to the previous image, e.g. in color, shape of groups of pixels, etc. Some implementations can use foreground and background pixels to assist in finding foreground subject pixels. In one example scenario, if the previous captured image depicts an empty scene (e.g., having only background and no subjects), and the current captured image includes a subject person, then the method knows that any pixels in the current image which are not in the previous image must be pixels depicting the subject person. This technique may not be possible if multiple people are present in the captured scene, and so a locator device or other tracking method can be used to find the subject person in such a case. Furthermore, if no empty image of the scene is available, then the locator device and/or other techniques can be used to determine the subject pixels.

In block 404, the method checks whether only a portion of the subject is to be changed in appearance in the image. In some implementations, this can be determined based on the received input command. For example, one type of input command can instruct or indicate whether an entire subject is to be changed in appearance, and a different command can instruct that just a portion of the subject is to be changed (and in some implementations, the input command can instruct which portion of the subject to change). Some implementations can check accessible user preferences or settings (e.g., at a server over a network) to determine whether the subject desires to be completely or partially changed in appearance, such that the input command need not specify the preference.

If the entire subject is to be changed, then the method continues to block 406, in which the method replaces the subject pixels with modified pixels. The particular modified pixels used to replace the original pixels can be any of a variety of different types, which can depend on the implementation and/or the preferences of the subject being changed. In some examples, the subject is to be obscured such that the subject no longer appears clearly (or at all) in the image, and in some implementations the identity of the subject can then no longer be recognized by an average viewer. Some types of obscuring examples are described below.

In some implementations, the modified pixels cause the subject to appear transparent (or "invisible" or "cloaked") in the image, e.g., as if the subject were not present in the image. This can be performed by replacing the subject foreground pixels with pixels depicting the background that are located behind the foreground subject. The values for the background pixels can be determined in different ways. For example, the method may have captured the same physical scene in an image at an earlier time when the subject was not present, and the entire image was background pixels. In some examples, the method knows the background pixels from the use of a depth map as described above. The method thus knows the value of each background pixel and replaces the corresponding foreground pixel of the subject. In implementations using multiple images, such as video, this background pixel information may be available from earlier frames or images in the video, or from later frames. For example, as a subject moves in a scene, the background pixels that were previously hidden can be learned on the fly and added to a background map. In other implementations, e.g., when such previous images may not be available, some background pixels can be estimated by the method 400. For example, the method can examine the pixels surrounding the subject and can estimate the background pixels behind the subject to be similar to those surrounding pixels. For example, if the surrounding background pixels depicted a particular color, pattern and/or texture, that same color, pattern or texture can be formed with the modified pixels and used in place of the foreground subject pixels. In another example, horizontal lines such as a transition between two background objects or regions (e.g., a horizon line or change in pixels from an object to a wall) can be continued in the modified pixels. This can create a background that is sufficient to fool the eye of the viewer and to make the subject appear invisible.

In other implementations, the modified pixels cause the subject to appear translucent in the image, where part of the background appears "through" each pixel of the subject, e.g., the subject appears hazy and/or the background pixels appear distorted as if viewed through curved glass or the like. This can be provided by determining the background pixels similarly as described above, and distorting the background pixels into a shape similar to the subject, or by blending (e.g., alpha blending) the background pixel values with the subject foreground pixel values.

In other implementations, the modified pixels cause the subject to appear obscured in other ways. For example, the subject can be made to appear blurry (e.g., using a blur or averaging technique) or covered in a single color of pixel. In other implementations, the subject can be made to appear "pixelated," e.g., covered in multiple large differently-colored square blocks (or other shapes) of pixels, such as a checkerboard pattern (e.g., see FIG. 13). For example, these modifications can be performed to obscure the identity of the subject. In such cases, the subject pixels determined in block 402 can be simply overwritten with the modified pixels providing the desired obscuring effect, without having to determine or place any pixels corresponding to a background behind the subject.

In other implementations, the appearance of the subject can be modified in different ways. For example, a subject can be revealed in an image, e.g., appear as in the original, unmodified captured image. This can occur in implementations in which all subjects in an image are initially or previously changed in appearance to be obscured, such as in a block before block 404 (not shown), or based on a previous input command. One or more of the subjects then provides an input command to cause those commanding subjects to be revealed as depicted in the original captured image previous to the obscuring. The method can simply replace any modified pixels with the original pixels in the captured image (or most recent captured image, in a video implementation).

In some implementations, other special effects can be made to the subject in the image using the modified pixels, e.g., for entertainment purposes. For example, a subject can be made a different color or can be changed in appearance to a different person or object. In some cases, pixels outside the subject can be modified for a particular effect, such as adding brighter pixels outside the perimeter outline of a subject (or portion of subject) to produce a glowing effect.

If only a portion of the subject is to be changed in appearance as determined in block 404, then the method continues to block 408, in which only a portion of the subject pixels are replaced with the modified pixels. The particular portion of the subject pixels can be replaced with modified pixels as described above, e.g., to obscure or reveal a portion of the subject. For example, the portion of the subject can be the face of a subject person, and this face can be obscured to hide the identity of the subject person. In another example, an article of clothing of a subject person can be changed in color, texture, etc. while leaving the rest of the person appearing the same as in the original image. In various implementations, the portion of the subject can be recognized using one or more classifiers and/or other recognition techniques, such as recognizing a face using facial recognition techniques.

Figure 5:
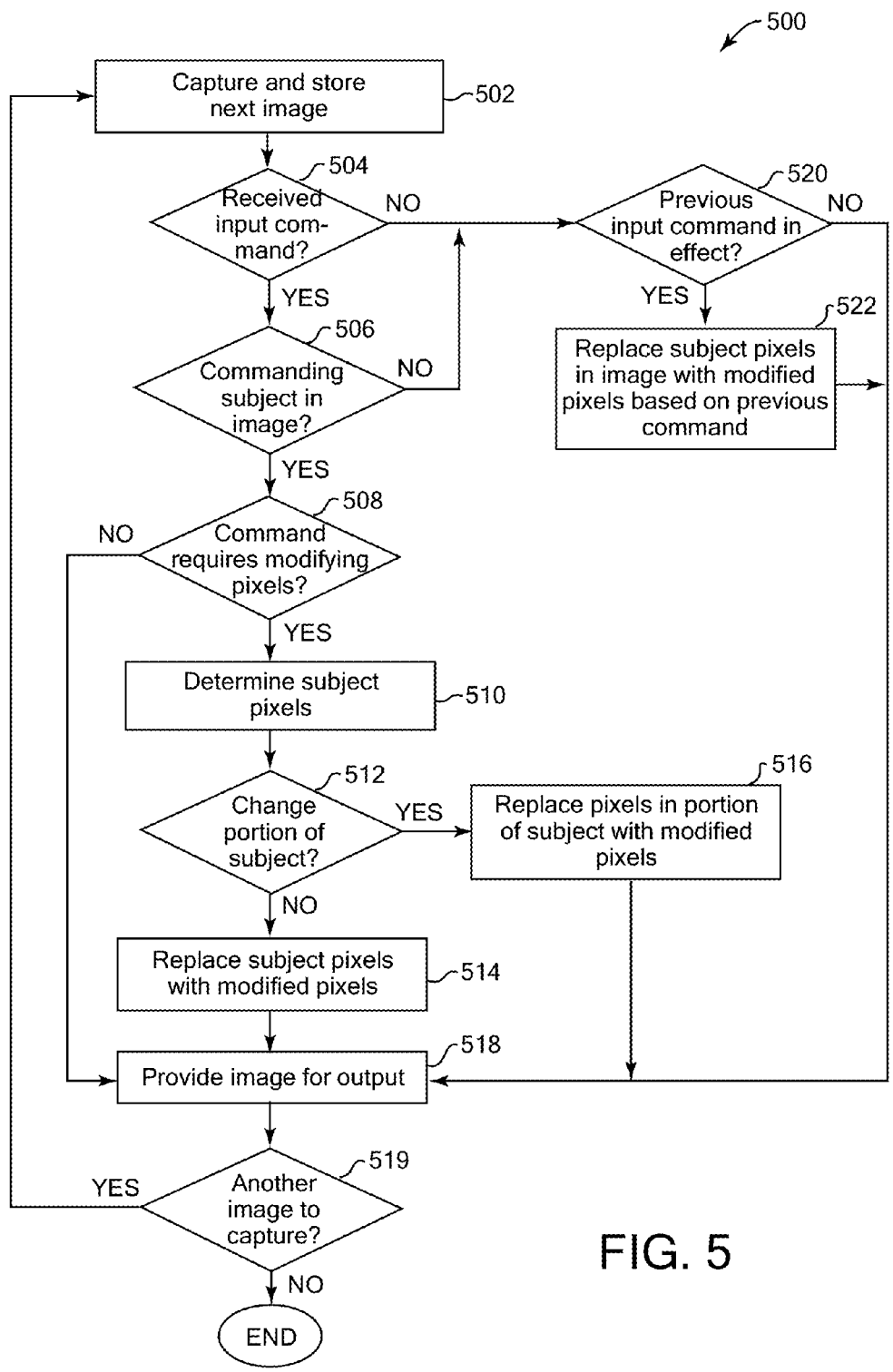
FIG. 5 is a flow diagram illustrating an example method for enabling self-initiated changing of appearance for subjects in a video, according to some implementations.

FIG. 5 is a flow diagram illustrating an example method 500 for enabling self-initiated changing of appearance of subjects in a video stream, according to some implementations. In this method, input commands from subjects can be received for changing their appearance in a sequence of multiple captured images. Method 500 can be implemented by a system such as a server and/or client device as described above for method 200.

In block 502, the method captures and stores a next image depicting a physical scene. The captured image in the device capturing the image can be similar to the images and devices described above with respect to block 202 of FIG. 2. The "next" image can be the next image in a sequence of captured images, or can be the first image at the beginning of the sequence.

In block 504, the method checks whether an input command has been received, the input command instructing a change of appearance of a subject in the image. The input command can be of any type, such as any of the types described above in FIG. 3, and can be received prior to or during the capture of the next image in block 502, or after the capture of a previous image (if any). For example, in some implementations, foreground and background pixel segmentation can be performed (e.g., using depth data) to distinguish subjects as foreground, and these foreground subjects can be analyzed for image commands.

If no input command has been received, then the method continues to block 520, described below. If an input command has been received, then in block 506, the method checks whether the commanding subject is located in the image. This can be determined, for example, using any of the techniques described above in FIG. 3. For example, the movement of one or more subjects can be tracked over successive frames using an electronic locator device physically located on the one or more subjects during the capture of the plurality of images. In some implementations, a subject can be tracked based on examining previous images. For example, a subject found in a previous image can be located in the current image by looking for similar pixels of the subject from the previous image in the current image, accounting for motion of the subject. A depth map can be used to determine foreground objects that are likely to be subjects. Some implementations can examine the motion of an object over successive images to recognize or confirm that the object is a subject person. For example, some implementations can use object recognition, such as a full body tracker, to locate a subject. Furthermore, some implementations can use a locator device in conjunction with visual tracking. For example, inertial sensors of the device (e.g., accelerometers and/or gyroscopes) can indicate motion of the device and the subject, which can be used to correlate or assist the visual tracking of moving subject pixels over multiple frames.

If the commanding subject is not located in the image, then the method continues to block 520, described below. If the commanding subject is located in the image, then in block 508, the method checks whether the received input command requires modifying any pixels of the captured image to provide the instructed change in appearance. For example, concealing or obscuring a subject that is currently not obscured in the image would require modifying the pixels, but revealing a subject that is currently (e.g., previously commanded to be) obscured does not require modifying any of the original pixels of the image. If the command does not require pixel modification, the method continues to block 518, described below.

If the command requires pixel modification, then in block 510 the method determines the pixels of the subject which are to be modified. This block can be similar to block 402 of FIG. 4, for example. In some implementations, one or more previous frames in the video sequence of images can be examined to assist in determining which pixels in the current image are subject pixels, e.g., by comparing and/or tracking subject pixels from previous frames. Foreground and background pixel segmentation can also assist in this process, as described above.

In block 512, method checks whether a portion of the subject is to be changed in appearance, which can be similar to block 404 of FIG. 4. For example, a particular type of input command can instruct to perform a partial change in appearance, while a different command can change the appearance of the entire subject. In one example, a gesture of the subject's hand moving from the top of the subject's head down to the neck can be detected as a command to just obscure the subject person's head. A hand over a different part of the subject's body can change only that part of the body. Some implementations can use a locator device to determine which part of the subject to change. For example, the subject can move a cell phone locator device across a portion of his or her body, which is tracked by the method and causes the method to "paint" the areas of his or her body covered by the locator device to be changed in appearance.

If the entire subject is to be changed, then the subject pixels are replaced with modified pixels in block 514. For example, this block can be similar to block 406 of FIG. 4. Various implementations can make the subject transparent (cloaked), translucent, pixelated, blurred, or otherwise obscured, while other implementations can reveal a previously-obscured subject or provide a special effect. In implementations that make a subject transparent or translucent, the foreground subject pixels can be replaced with corresponding background pixels that are previously-known, determined on the fly, or estimated. For example, a background model of pixels can be built for the physical scene that indicates all the background pixel values. In implementations using a static camera to capture the multiple images, a two-dimensional background model can be built. In implementations using a moving camera to capture the images, a three-dimensional background model can be built to determine background pixels from any camera viewing angle in the scene. In some cases, any unknown background pixels can be inserted in the model as a foreground subject moves in the scene and exposes those pixels, e.g., if all the background pixels were not already known. In some implementations, the background model is continuously updated with the latest visible background pixels in the latest frames to reflect any changes in the scene.

Some implementations can change all determined foreground pixels in appearance, while leaving the background pixels the same. In some implementations, this causes all the moving objects in the scene to be changed in appearance. Other implementations can identify which particular foreground pixels belong to the commanding subject using one or more techniques described above, which are the only pixels changed. In another implementation, the captured images, or a predetermined region in the captured images, is continuously displayed with background pixels (e.g., a static image or a looping set of images showing background pixels), and is changed to the actual captured pixels in response to receiving an input command. For example, the images can continually be changed to show background pixels depicting an empty room to cloak any person or object in the room, until an input command is received which causes the actual captured pixels of the room to be displayed and any present objects in the room revealed. Alternately, the cloaking background pixels are displayed only in response to receiving an input command. The method then continues to block 518.

If a portion of the subject is to be changed in block 512, then subject pixels of the portion are replaced in block 516. For example, this block can be similar to block 408 of FIG. 4. The method then continues to block 518.

In block 518, the method causes the image to be output, similarly as described above in block 208 of FIG. 2. In block 519, the method checks whether there is another image to capture, such as the next frame of a video stream. If not, the method ends. If there is another image to capture, the method returns to block 502 to capture and store the next image.

If in block 504 an input command has not been received, then the method continues to block 520, in which the method checks whether one or more previous input commands are still in effect, these input command(s) instructing a change the appearance of one or more subjects. For example, a subject may have provided an input command during the capture of a previous frame, which caused the method to obscure that subject in the image by modifying pixels. Since there has been no new input command to alter the effect of the previous command, the method should continue to obscure the subject in images following the frame in which the input command was detected. Thus, if one or more previous commands are in effect, the method continues to block 522 to replace subject pixels in the image with modified pixels based on previous command(s) that are in effect. After block 522, or if no previous input command is in effect in block 520, the method continues to block 518 to output the image and check for another image to capture in block 519.

Various blocks and operations of methods 200-500 can be performed in a different order than shown and/or at least partially simultaneously, where appropriate. For example, some implementations can perform blocks 304 and 314 (and their resulting blocks) simultaneously. In some implementations, blocks or operations of methods 200-500 can occur multiple times, in a different order, and/or at different times in the methods. In some implementations, the methods 200, 300, 400, and/or 500 can be implemented, for example, on a server system 102 as shown in FIG. 1. In some implementations, one or more client devices can perform one or more blocks instead of or in addition to a server system performing those blocks. For example, a client device can perform most blocks and can request more complex or intensive processing to be performed by a server in communication with the client device.

Figure 6:
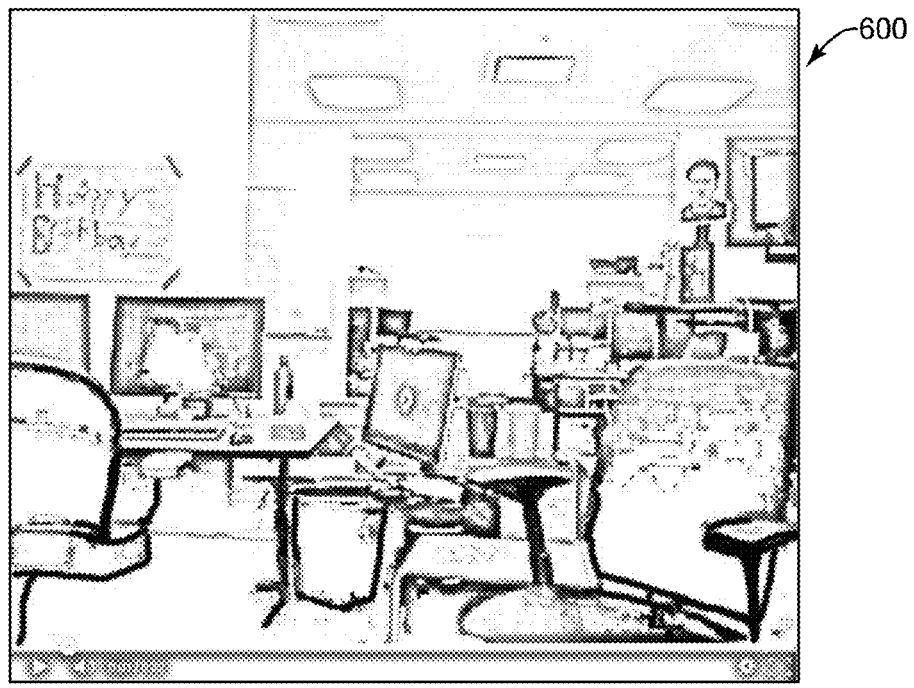
FIGS. 6-11 are diagrams illustrating example images depicting a translucent subject using example methods of FIGS. 2-5.

FIGS. 6-11 are illustrations example images (e.g., frames) captured for a video stream in which self-initiated changing of appearance of subjects is performed according to an example implementation. FIG. 6 shows an output image 600 which is captured near the beginning of the video stream, and which depicts a physical scene. In this example, the image is captured by a camera and can be processed by a system according to features described herein, e.g., by a client or server device. In some implementations, the image 600 (and the other images described below) can be displayed on a display device, e.g., of one or more client devices, or a server system in some implementations. In one non-limiting example, a user can view the images displayed by a display device in a graphical interface provided by a client device or server device. In this example, no input commands were received by the system before the capture and display of image 600, and no objects in the scene are considered subjects, so the scene is displayed as empty of subjects and depicting a background.

Figure 7:
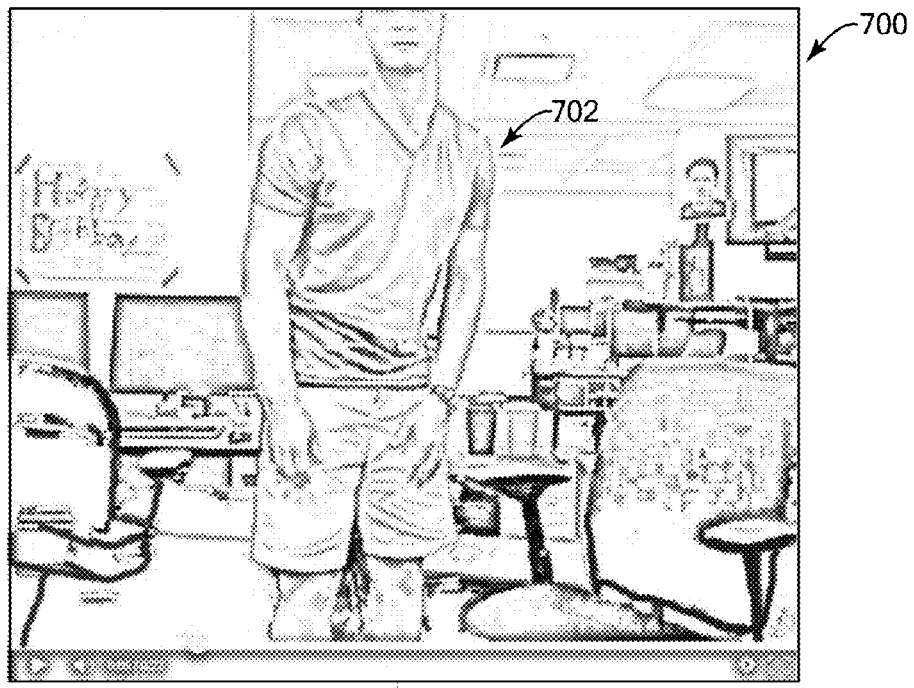
Figure 8:
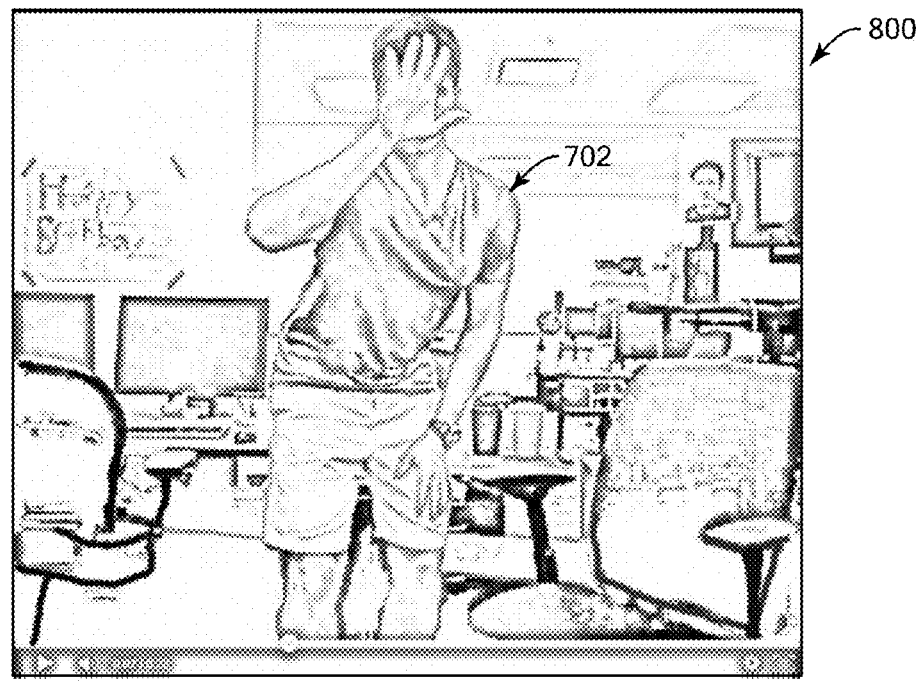

FIG. 7 shows an image 700 that has been captured and displayed as a later frame in the video sequence. A person 702 has entered the scene. However, the system implementing the features described herein has not received any input command, and therefore no changes are made to the image 700. FIG. 8 shows an image 800 that is a later frame in the video stream after image 700. The person 702 is providing an image command, which in this example is a hand sign performed by the person. For example, the hand sign can be a held open hand with fingers pointing upward and thumb extended. In some implementations, the hand sign is required to be positioned in front of the face of the person who is performing the sign, in order for the signing to be recognized by the system as an image command to obscure the subject. For example, the system can detect the hand sign and then determine whether this sign is positioned over the face of the signing subject person, where the person subject can be recognized based on classifiers or other recognition techniques.

Figure 9:
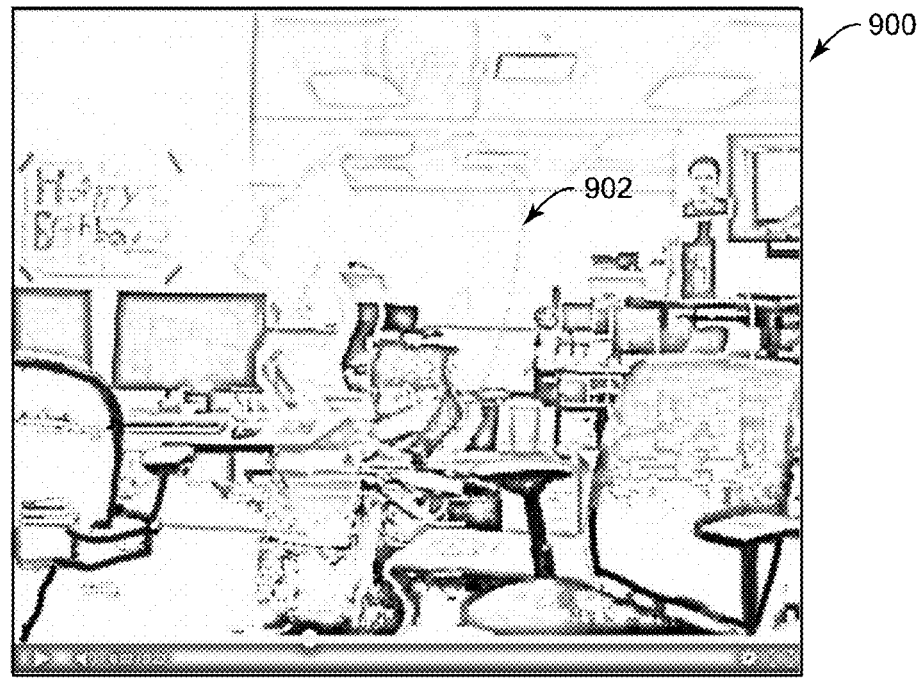

FIG. 9 shows an image 900 that is a later frame in the video stream after image 800. In image 900, the system has detected the image command of the hand sign in image 800, and has detected the person 702 as the subject providing the image command. In this example, the image command shown in image 800 is a command to obscure the subject in the image and make the subject translucent. Thus, in image 900, the subject person 702 has been made translucent and is shown as subject 902. In this example, the translucence is implemented by replacing the pixels of the subject 702 with background pixels behind the subject 702, which are known from the initial background scene, such as from image 600 of FIG. 6. A distortion affect is also applied to the background pixels to form an approximate shape of the subject person 702, shown as a dim outline in FIG. 9.

Figure 10:
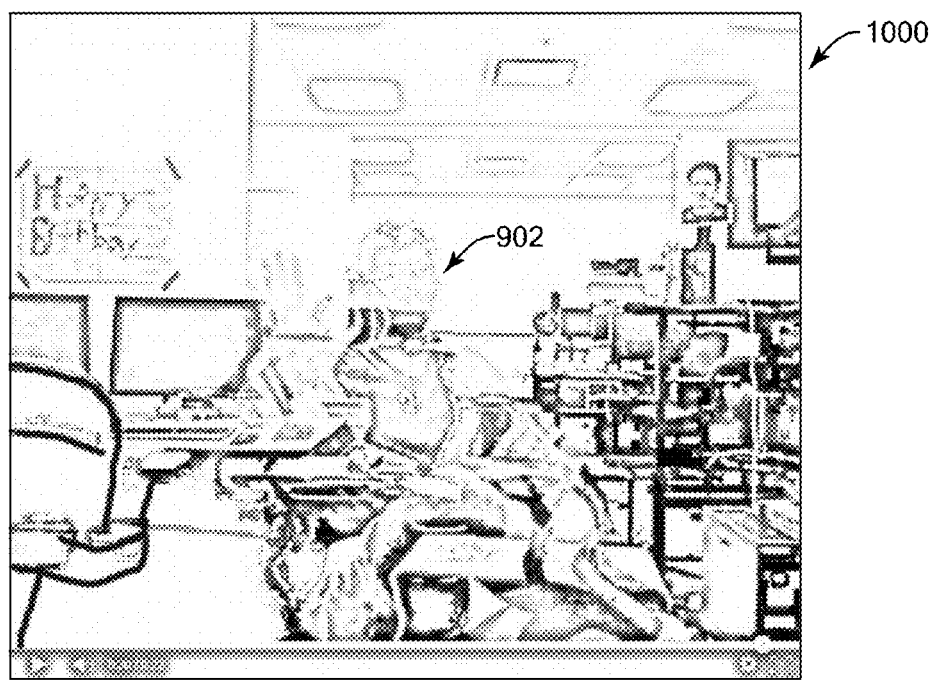

FIG. 10 shows an image 1000 that is a later frame in the video stream after image 900. The subject person 702 has been changed in appearance by the system in each of the frames captured after image 900 up to image 1000, since no new input command has been received. In image 1000, the subject person 702 has moved to sit in a chair and also provides an input command to turn off the translucence effect in the video stream. In this example, the input command is implemented as a gesture that is examined by the system over multiple frames of the video. For example, an open hand that has moved from right to left (from the camera's viewpoint) is a gesture interpreted by the system as a command to turn off the translucence effect. This gesture can be detected by examining several successive frames to detect the required motion and the required hand position.

Figure 11:
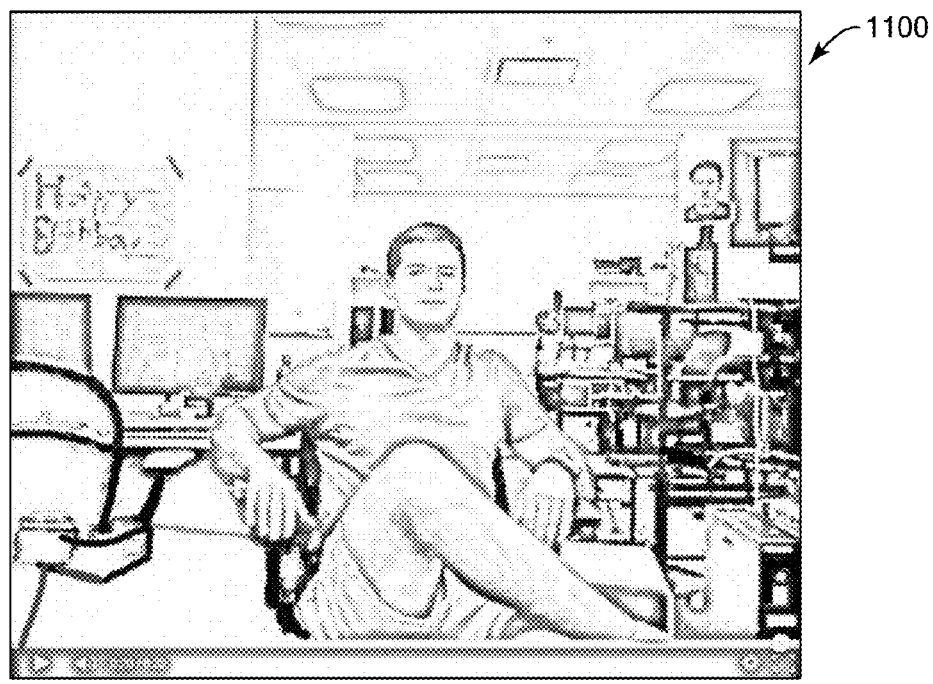

FIG. 11 shows an image 1100 that is a later frame in the video stream after image 1000. In response to the image command detected in image 1000 and other previous images, the subject person 700 has been revealed as depicted in the captured image with the translucence effect removed. The system can simply output the captured frame without providing any processing to modify its pixels.

Figure 12:
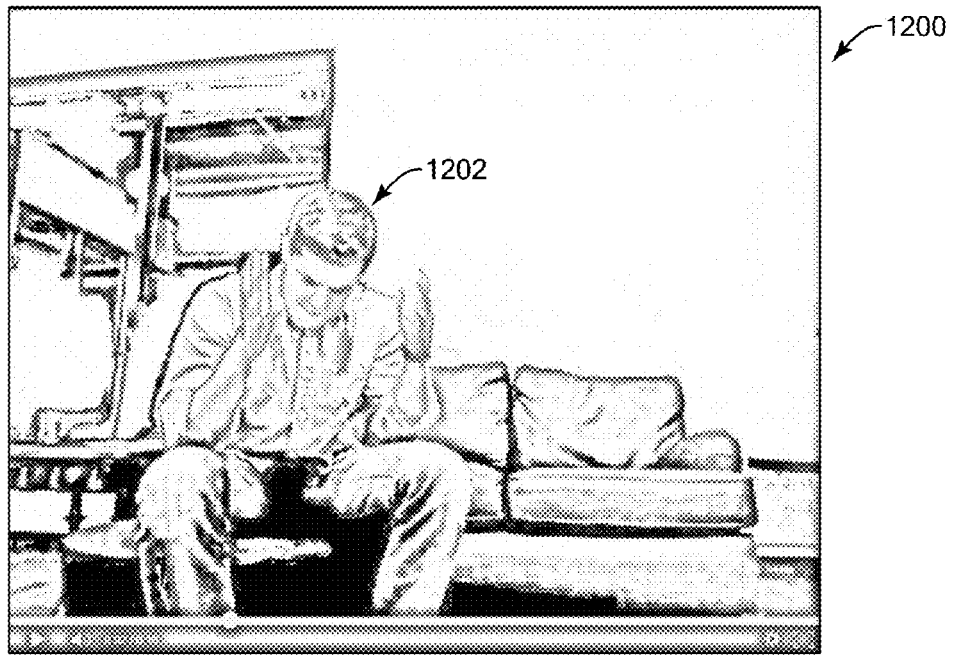
FIGS. 12-14 are diagrams illustrating example images depicting a pixelated subject using example methods of FIGS. 2-5.
Figure 13:
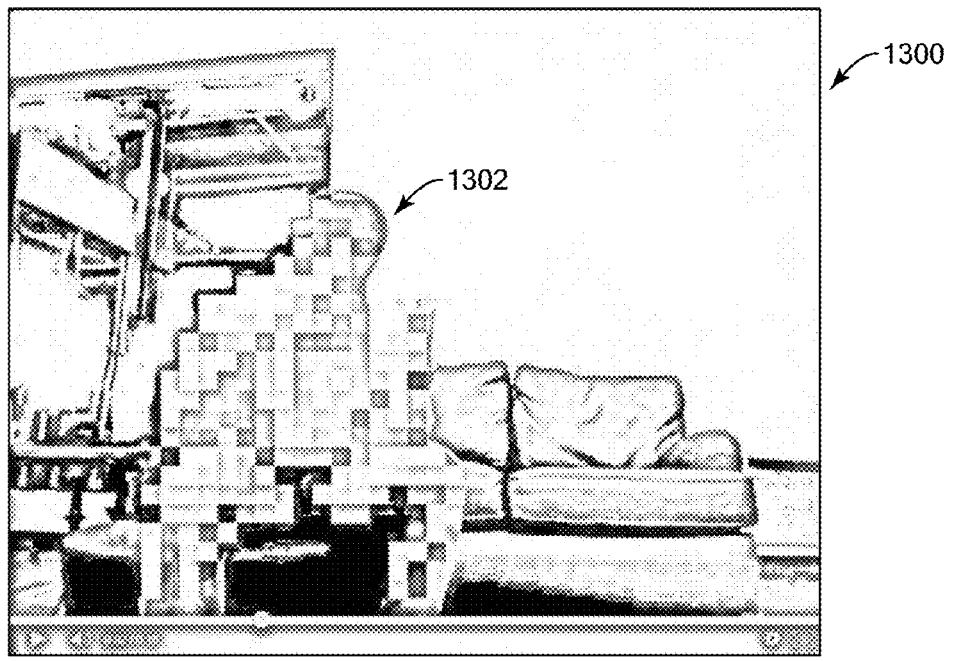
Figure 14:
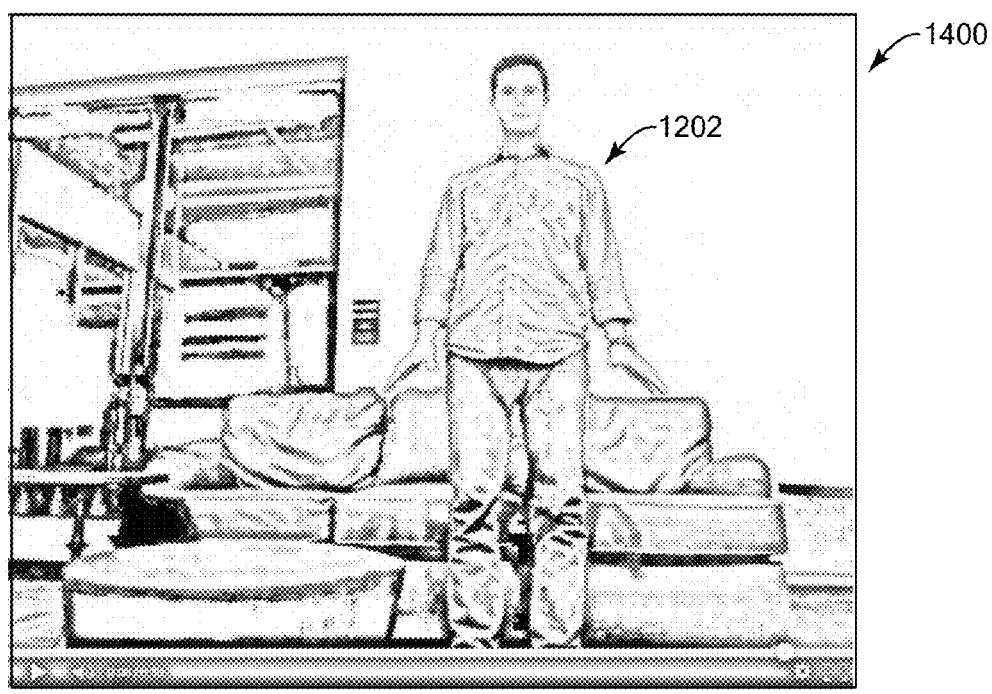

FIGS. 12-14 are illustrations of additional example images (e.g., frames) captured for a video stream in which self-initiated changing of appearance of subjects is performed according to one implementation. FIG. 12 shows an image 1200 that has captured a scene including a person 1202. The person 1202 is providing an image command, which in this example is a hand sign performed by the person. In this example, the hand sign is a hand gesture, in which the two hands of the subject are moved together in an up-and-down motion. The system can examine a number of frames of the video stream to detect this gesture. In some implementations, the hand gesture can be required to be accompanied by a head motion (e.g., up and down) to be detected as an input command to change image appearance. Some implementations can require that the hand gesture be accompanied by a voice command, such as a particular phrase or word, to be detected as an input command to change image appearance. In an alternative implementation, the subject person 1202 is carrying a handheld device and presses a button on the device to send a wireless signal to the system as the input command.

FIG. 13 shows an image 1300 that is a later frame in the video stream after image 1200. For this image, the system has detected the input command provided by the subject person 1202. Based on the input command, the system has modified the pixels of the subject 1202 to show a pixelated appearance 1302 of the subject. In this example, the pixelated appearance includes several square or rectangular blocks filling in the shape of the subject in the image. In some implementations, these pixels can be made to move, change colors or positions, etc. within the shape of the subject.

FIG. 14 shows an image 1400 that is a later frame in the video stream after image 1300. Previous to image 1400, the subject person 1202 has moved within the scene, and the system has continued to display the subject as a pixelated shape, since no new input command has been received. In the frames just before image 1400, the subject person 1202 provides a second image command in the form of a gesture to instruct the system to remove the pixelated change in appearance. In this example, the second input command is a hand/body gesture in which the person puts his or her hands down at his or her sides and moves the hands up and outward as shown in FIG. 14. In some implementations, the system can detect the entire body of a subject to detect this command, while in other implementations just the two hands can be detected. After detecting this command, the system removes the pixelated change in appearance of the subject person 1202, thus outputting the captured image 1400 as shown in FIG. 14 without any modification of pixels.

Although the examples of FIGS. 6 to 14 illustrate various features with respect to a sequence of images provided in a video stream, similar features can be implemented with still images. For example, a hand sign shown in any of FIG. 8, 12 or 14 can be detected in a still image which can cause the subject to be changed in appearance in that same image before the image is output. In addition, these examples illustrate implementations in which input command to turn on a change in appearance is different than the input command to turn off that change in appearance. In other implementations, the same command can be used for both of these functions, for example.

Many scenarios can be implemented using features described herein. For example, a man is in a living room having a video chat with his parents. His wife has no interest in talking to the parents at this time, so on her phone she finds the video chat listing on a server and "mutes" herself, e.g., provides a device command to the video chat system. When she walks into the living room, her image is made transparent and invisible in the video chat stream so that the parents never see her. In another scenario, a child is playing hide and seek in a video conference with a faraway grandparent. The child puts her hand over her face and suddenly appears translucent on the grandparent's screen. Eventually she puts her hand back up to her face to reappear in the video stream. In another scenario, college kids are at a party that's getting rowdy and several people are wearing cameras on wearable devices. An aspiring politician at the party has a phone in his pocket set to "cloak," which will send this device command to all cameras in his area to obscure his image in any pictures or videos taken in which he is clearly identifiable. In addition, he's wearing a privacy shirt which is in a color that automatically opts him out of being identifiable in anyone's video or photostream as a default privacy image command built into the camera devices by the manufacturer.

Figure 15:
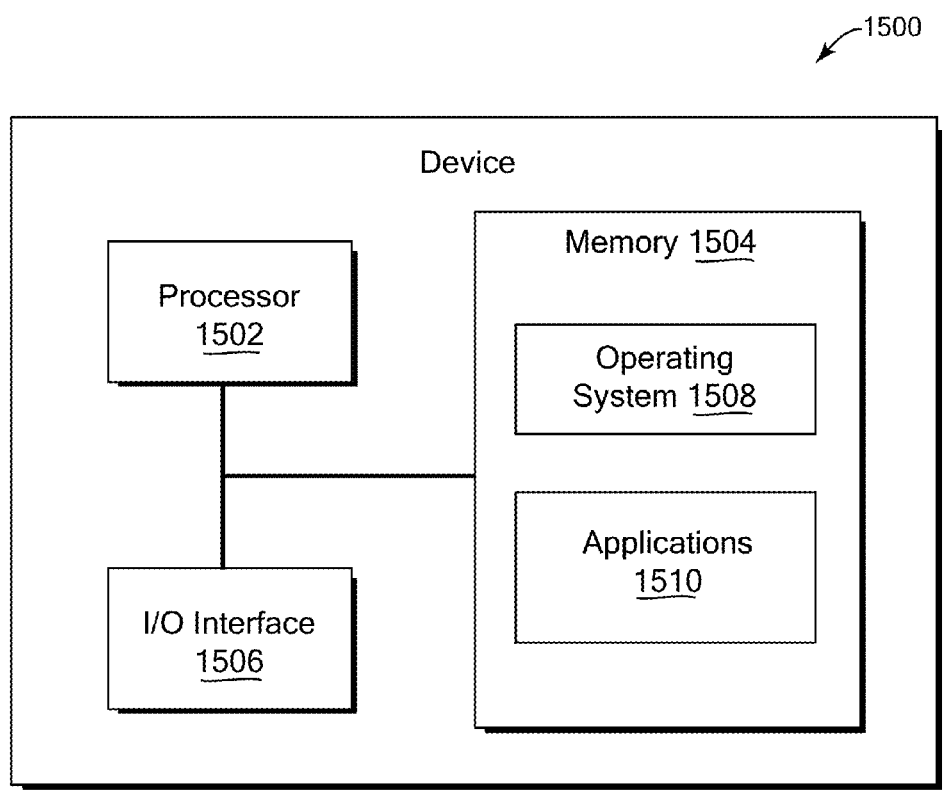
FIG. 15 is a block diagram of an example device which may be used for one or more implementations described herein.

FIG. 15 is a block diagram of an example device 1500 which may be used to implement one or more features described herein. In one example, device 1500 may be used to implement server device 104 of FIG. 1, and perform appropriate method implementations described herein. Device 1500 can be any suitable computer system, server, or other electronic or hardware device. For example, the device 1500 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 1500 includes a processor 1502, a memory 1504, and input/output (I/O) interface 1506.

Processor 1502 can be one or more processors or processing circuits to execute program code and control basic operations of the device 1500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1504 is typically provided in device 1500 for access by the processor 1502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1502 and/or integrated therewith. Memory 1504 can store software operating on the device 1500 by the processor 1502, including an operating system 1508 and one or more applications engines 1510 such as a graphics editing engine, web hosting engine, social networking engine, etc. In some implementations, the applications engines 1510 can include instructions that enable processor 1502 to perform the functions described herein, e.g., some or all of the methods of FIGS. 2-5. Any of software in memory 1504 can alternatively be stored on any other suitable storage location or computer-readable medium. In addition, memory 1504 (and/or other connected storage device(s)) can store images, data describing implemented input commands, classification and recognition data, and other data used in the features described herein. Memory 1504 and any other type of storage (magnetic disk, optical disk, magnetic tape, or other tangible media) can be considered "storage devices."

I/O interface 1506 can provide functions to enable interfacing the device 1500 with other systems and devices. For example, network communication devices, storage devices such as memory and/or database 106, and input/output devices can communicate via interface 1506. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 15 shows one block for each of processor 1502, memory 1504, I/O interface 1506, and software blocks 1508 and 1510. These blocks may represent one or more processors or processing circuitries, operating systems, memories, I/O interfaces, applications, and/or software modules. In other implementations, device 1500 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as any of client devices 120-126 shown in FIG. 1. Example client devices can include some similar components as the device 1500, such as processor(s) 1502, memory 1504, and I/O interface 1506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the modified images and/or user preferences or other controllable features as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes preferences.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
receiving a captured and stored sequence of images depicting a physical scene;
analyzing at least one image of the sequence of images;
detecting a visual command appearing in the at least one image, the visual command provided by a person depicted in the at least one image, wherein the visual command instructs a change in visual appearance of the person in the at least one image; and
obscuring the visual appearance of the person in accordance with the visual command, wherein the visual appearance is obscured in at least one or more images following the at least one image in the sequence, and wherein the obscuring includes changing the visual appearance of the person to be partially transparent in the at least one image, including placing a previously-captured or estimated background image portion of the physical scene over a portion in the at least one image corresponding to the person.

2. The method of claim 1 wherein the changing the visual appearance of the person to be partially transparent includes blending background pixel values with corresponding foreground pixel values of the person.

3. A method comprising:
receiving a stored plurality of captured images, the plurality of captured images depicting a physical scene over time;
determining that an input command provided by a subject depicted in the plurality of captured images has been received, wherein the input command instructs a change in visual appearance of at least a portion of the subject in a set of the plurality of captured images, wherein determining that an input command has been received includes detecting motion of an electronic locator device held by the subject in the plurality of captured images;
determining a location of the subject in the plurality of captured images based on one or more electronic signals obtained from the electronic locator device physically located at the subject during capture of the plurality of captured images; and
changing the visual appearance in the set of the plurality of captured images of the at least a portion of the subject in accordance with the input command, including changing the visual appearance of one or more areas of the subject covered by the detected motion of the electronic device held by the subject, wherein the stored plurality of captured images are provided for output in sequence as a video.

4. The method of claim 3 wherein the subject depicted in the plurality of captured images includes a person, and wherein determining that an input command has been received includes determining that the input command is provided in one or more electronic command signals from the electronic locator device, wherein the one or more electronic command signals are external to the plurality of captured images.

5. The method of claim 4 wherein determining that an input command has been received includes:
determining an associated identity of the subject using object recognition; and
determining that the associated identity has sent the input command.

6. The method of claim 5 wherein determining that the associated identity has sent the input command includes receiving identity information in one or more electronic identity signals from the electronic locator device.

7. The method of claim 3 wherein determining that an input command has been received includes determining that the subject depicted in the plurality of captured images has provided the input command as an image command that appears in one or more of the plurality of captured images.

8. The method of claim 7 wherein the image command includes a distinctive indicator located on the subject in the plurality of captured images, wherein the distinctive indicator is identifiable in the plurality of captured images based on directing non-visible light onto the distinctive indicator during capture of the plurality of captured images and detecting absorption or reflection of the non-visible light.

9. The method of claim 7 wherein the subject depicted in the plurality of captured images includes a person, and wherein the image command includes at least one of a body sign and a gesture detected in the plurality of captured images, wherein the at least one of the body sign and the gesture is formed with one or more body parts of the person.

10. The method of claim 3 wherein determining that an input command has been received includes:
sensing a voice command spoken by the subject; and
locating the subject providing the voice command in the plurality of captured images by examining the plurality of captured images for a visual indication of a person speaking.

11. The method of claim 3 wherein changing the visual appearance includes obscuring at least a portion of the subject in the plurality of captured images by modifying pixels in the plurality of captured images.

12. The method of claim 11 wherein obscuring at least a portion of the subject includes changing the subject to be partially transparent in the plurality of captured images, including placing a previously-captured or estimated background image portion of the physical scene over the at least a portion of the subject in the plurality of captured images.

13. The method of claim 3 further comprising:
examining the plurality of images to detect motion of the subject; and
determining that the moving subject correlates with the electronic locator device.

14. The method of claim 3 further comprising:
determining that the subject has provided a second input command instructing to remove the change of appearance; and
removing the change of appearance to restore an original appearance of the plurality of captured images.

15. A system comprising:
a storage device; and
at least one processor accessing the storage device and operative to perform operations comprising:
receiving at least one captured image, the at least one image depicting a physical scene;
determining that an input command has been received in one or more electronic signals external to the at least one image and received from an electronic device, wherein the input command instructs a change in visual appearance of at least a portion of a subject depicted in the at least one image;
determining that the electronic device is present at the subject in the physical scene during capture of the at least one image, wherein the electronic device locates the subject in the image; and
changing the visual appearance in the at least one image of at least a portion of the subject in accordance with the input command, wherein changing the visual appearance includes obscuring the at least a portion of the subject in the at least one image by modifying pixels in the at least one image, wherein obscuring the at least a portion of the subject includes changing the subject to be partially transparent in the at least one image, including blending a background image portion of the physical scene with the at least a portion of the subject in the at least one image.

16. The system of claim 15 further comprising determining that an image command has been received from the subject depicted in the at least one image, wherein the image command appears in one or more of the at least one image, and wherein the electronic device has a location in the physical scene that corresponds to the image command.

17. The system of claim 15 wherein the at least one image is a plurality of images, and wherein determining that an input command has been received includes detecting motion of the electronic device held by the subject in the plurality of images, and
wherein changing the visual appearance of the at least a portion of the subject includes changing the visual appearance of one or more areas of the subject covered by the detected motion of the electronic device held by the subject.

* * * * *